United States Patent Office 3,672,863
Patented June 27, 1972

3,672,863
DRY AMINOTRIAZOLE HERBICIDAL FORMULATION
James Edward Esposito, Ambler, Pa., assignor to Amchem Products, Inc., Lower Gwynedd Township, Montgomery County, Pa.
No Drawing. Filed Mar. 28, 1969, Ser. No. 811,583
Int. Cl. A01n 13/00
U.S. Cl. 71—82　　　　　　　　　　　　　　　2 Claims

ABSTRACT OF THE DISCLOSURE

A non-caking, water soluble, powdered herbicidal concentrate containing 3-amino-1,2,4-triazole and ammonium thiocyanate in admixture with a pregelatinized cold water starch and an ultrafine filler.

BACKGROUND OF THE INVENTION

It is known from U.S. Pat. 2,992,089 that thiocyanate salts potentiate the herbicidal activity of 3-amino-1,2,4-trizole. The commercial use of this invention has proven to be highly successful and it is estimated that a major portion of the 3-amino-1,2,4-triazole sold for herbicidal purposes is used in combination with an alkali metal or ammonium salt of thiocyanic acid. Since both the 3-amino-1,2,4-triazole and the thiocyanate are highly water soluble this combination product has been readily available in liquid concentrate form. Attempts at dry formulations, particularly with the desirable ammonium thiocyante, on the other hand, have been uniformly unsuccessful owing to the high deliquescence of ammonium thiocyanate. This deliquescent property of ammonium thiocyanate renders it totally unsuitable for dry formulations since the ammonium thiocyanate imparts an unsuitable hygroscopic character to the resulting composition rendering its unacceptable due to caking, lumping, etc. While the desirabilitiy of having a soluble powder or granular concentrate which need only be diluted with water for use has been generally recognized, attempts to minimize the hygroscopic nature of these formulations by mixing them with dessicants to form a solid concentrate have not met with success. Products which have been manufactured in this fashion are difficult to fabricate requiring specially dehumidified rooms and if left exposed even for a short duration they become deliquescent and difficult to measure and use. For instance, the use of conventional drying agents such as phosphorous pentoxide, magnesium perchlorate, potassium hydroxide, barium perchlorate, calcium oxide, silicon dioxide, etc., for one reason or another have not proven successful. Consequently the preparation of commercial concentrated herbicidal formulations of 3-amino-1,2,4-triazole and a water soluble thiocyanate salt have been confined to liquid concentrates wherein the 3-amino-1,2,4-triazole and thiocyanate ingredients are dissolved in water in the highest practical concentration. As a matter of fact in order to produce a composition which will remain as a homogenous true solution of these ingredients stable at temperatures below about 30° F. it has been necessary to add an acid such as hydrochloric acid to the formulation to prevent "salting out" of the concentrated active ingredients. Such acid addition renders the composition even less desirable owing to the high degree of corrosivity.

BRIEF DESCRIPTION OF THE INVENTION

The principal object of the present invention is to prepare a water soluble mixture of 3-amino-1,2,4-triazole and a water soluble thiocyanate in either a powder or granular form which will not liquify and which will remain free flowing even under high atmospheric humidity conditions.

A concomitant object of the present invention is to prepare such an admixture which when diluted with water has sufficient solubility or dispersibility as to pose no problems when being used for weed eradication in conventional spray equipment.

A still further object of the present invention is to produce a non-corrosive and non-hazardous concentrated formulation of 3-amino-1,2,4-triazole and a water soluble thiocyanate.

These objects as well as other objects and advantages of the present invention are secured in accordance with the disclosure appearing below.

DETAILED DESCRIPTION

The present invention is based upon the discovery that when dried, pregelatinized cold water swelling starch is thoroughly admixed with 3-amino-1,2,4-triazole and a soluble thiocyanate and an ultrafine inert filler material there is obtained a composition which will not cake when subjected to adverse conditions of high humidity for extended periods of time. For example the compositions of this invention remain free flowing after exposure to 100% humidity for 48 hours and more. Even longer exposure at lower humidity will not effect the free flowing property. Additionally, such admixtures when diluted with water have sufficient solubility or dispersibility as to impose no problems when used in conventional spray equipment for weed eradication.

The dried pregelatinized starches suitable for use in the compositions of this invention are any of the pregelatinized cold water swelling starches. Such starches are generally available in the art and are ordinarily employed as general purpose thickeners or binders. The dried pregelatinized starches employed for the novel compositions of this invention can be prepared from any type of starch product and will ordinarily have a moisture content between about 8 and about 15% by weight. Predried, gelatinized starch from any source, i.e., corn, potatoes, rice, etc., can be used. Ordinarily owing to availability and cost cornstarch will be preferred in the United States, potato starch in Europe and rice in the Far East. However, tapioca and root starches may also be used.

In general, the dried pregelatinized starch must be present in an amount of at least about 3% and preferably about 4.5% by weight of the total weight of the herbicidal composition comprising starch, filler, amino-triazole and thiocyanate. Lower amounts will under conditions of high humidity result in caking and lumping due to moisture taken up by the thiocyanate and aminotriazole. The upper limit of starch is not critical, though ordinarily not more than about 20% by weight is incorporated and ordinarily less than 10% by weight is sufficient. In general herbicidal concentrates formulated according to this invention will contain approximately 4 to 6% by weight of the dried pregelatinized starch.

The ultrafine filler materials suitable for use in the compositions of this invention are for example silicon dioxide or aluminum oxide particularly those with high surface area and very fine particle size. Especially preferred is a precipitated hydrated silica having an average particle size of about 22 millimicrons and a total surface area of about 125 to 165 m.$^2$/g. The ultrafine filler material is employed in amounts in excess of about 3% by weight of the total composition and ordinarily not in excess of about 50% by weight of the total. The preferred composition will contain between about 5 and about 10% by weight of precipitated hydrated ultrafine silicon dioxide. The ultrafine silicon dioxide filler materials employed are commercially available for use in the preparation of wettable powders.

In addition to the herbicidally active ingredient, i.e., the amino-triazole and ammonium thiocyanate (usually present in a ratio between about 0.5 about 1.25 parts ammonium thiocyanate to about 1 part of amino-triazole) and the dried pregelatinized cold water starch powder and ultrafine filler there can also be added other optional ingredients such as other phytologically inert fillers such as attaclay, sodium sesquicarbonate, wetting agents, surfactants and other conventional inert excipients. Such optional ingredients will ordinarily comprise about 5 to 50% by weight of the total concentrate. While ammonium thiocyanate constitutes the preferred thiocyanate salt other water soluble salts for example lithium-thiocyanate or calcium-thiocyanate can also be used. When lithium-thiocyanate is employed a suitable product can be obtained without including an ultrafine filler. The lithium-thiocyanate is employed in about the same proportion as ammonium thiocyanate. The herbicidal concentrates of this invention can also include other herbicidally active substances or can be incorporated into or combined with other dry herbicidal formulations. Particularly desirable herbicidal compositions can be prepared by combining the dry formulations of this invention with dry forms of substituted triazine herbicides such as Atrazine, Simizine and the like.

The dry formulations of this invention offer a number of distinct advantages over the presently available liquid concentrate forms of the amino-triazole/thiocyanate herbicides. Thus, for example, the dry formulation facilitates packing, storage and shipping; it eliminates the need for corrosion resistant containers and applicators; it can be readily combined with dry formulations of a number of other herbicides. Moreover the activity of the present concentrate is equal to or better than that obtained with conventional liquid formulations based on equivalent amounts of the active ingredients. Test results with aqueous herbicidal spray solutions formulated from the dry concentrates of this invention are shown below.

METHOD

Established perennial plants of *Agropyron rapens*, *Cynodon dactylon* and *Artemisia vulgaris* were sprayed at 40 gallons per acre with the track sprayer as a foliar spray. The treatments were run in triplicate. Top growth was cut and removed three weeks later to allow a reading of the regrowth. Final evaluation was made 5 weeks after topping. The following standard was used:

0—No apparent difference from checks.
1-4—Some albinism and some foliar inhibition.
5-7—Considerable albinism and not to exceed 50% of the foliage on checks.
8—Very little foliage and almost no chlorophyll.
9—No foliage, live roots or rhizomes present.
10—Rhizomes and roots dead as well as tops.

Ratings for 3 replicates averaged and multiplied by 10= average percent weed kill—shown in the table below.

EXAMPLE I

| | Percent |
|---|---|
| Pregelatinized cornstarch | 4.5 |
| 3-amino-1,2,4-triazole | 50.0 |
| Lithium thiocyanate | 45.5 |
| | 100.0 |

EXAMPLE II

| | Percent |
|---|---|
| 3-amino-1,2,4-triazole | 50.0 |
| Ammonium thiocyanate | 37.0 |
| Pregelatinized potato starch | 5.0 |
| Amorphous, hydrated silicon dioxide | 8.0 |
| | 100.0 |

EXAMPLE III

| | Percent |
|---|---|
| 3-amino-1,2,4-triazole | 45.0 |
| Ammonium thiocyanate | 45.0 |
| Precipitated hydrated silicon dioxide (fine particle size)* | 10.0 |

*Such as HiSil 233 available from Pittsburgh Plate Glass Co.

EXAMPLE IV

| | Percent |
|---|---|
| 3-amino-1,2,4-triazole | 50.0 |
| Ammonium thiocyanate | 38.0 |
| Dried pregelatinized cornstarch | 6.0 |
| Precipitated hydrated silicon dioxide (fine particle size) | 6.0 |

EXAMPLE V

| | Percent |
|---|---|
| 3-amino-1,2,4-triazole | 25.0 |
| Ammonium thiocyanate | 25.0 |
| Dried pregelatinized cornstarch | 5.0 |
| Other finely divided water insoluble herbicide such as atrazine or simizine | 30.0 |
| Hydrated silicon dioxide | 5.0 |
| Suspending of dispersing agents | 10.0 |

EXAMPLE VI

| | Percent |
|---|---|
| 3-amino-1,2,4-triazole | 40.0 |
| Calcium thiocyanate | 35.0 |
| Dried pregelatinized cornstarch | 5.0 |
| Precipitated hydrated silicon dioxide (fine particle size) | 5.0 |
| Suspending or dispersing agents | 15.0 |

All of the above formulations were prepared individually by being thoroughly admixed for a period of 20 minutes in a twin cone blender. After blending they were all ground to a size that would pass through a Tyler 20 mesh screen.

AVERAGE PERCENT WEED KILL

| | 3 lb./A | | | | 6 lb./A | | | |
|---|---|---|---|---|---|---|---|---|
| | Quack grass | Bermuda grass | Mugwork | Avg. | Quack grass | Bermuda grass | Mugwork | Avg. |
| Liquid formulation of aminotriazole and ammonium thiocyanate | 83 | 73 | 87 | 81 | 90 | 77 | 87 | 85 |
| Dry formulation | 80 | 73 | 87 | 80 | 90 | 77 | 87 | 85 |

This data illustrates the equivalence in herbicidal effect between herbicidal spray prepared from conventional liquid concentrate and the dry concentrate of this invention when applied at the same rate based on the amount of active ingredient.

The following examples illustrate suitable formulations of dry herbicidal concentrates falling within the purview of this invention. These examples are intended to illustrate the invention and are not to be construed as limitative thereof.

All of the formulations were evaluated as to their caking character under conditions of 100% humidity at room temperature for a period of 48 hours. At the end of 48 hours the compositions of Examples I, II, IV and V were wet to the touch but were substantially non-caking. The formulation of Example III which was prepared without starch for purposes of comparison was completely liquidfied. The formulation of Example V demonstrates that the compositions of the present invention can be combined with other of the so-called commercially available "wettable powder" herbicidal concentrates without suffering any detrimental effects.

What is claimed is:

1. A dry powder herbicidal concentrate comprising a uniformly distributed mixture of at least about 50 percent by weight of a herbicidally effective combination of 3-amino-1,2,4-triazole and a water soluble salt of thiocyanate, such that there are about 0.5 to about 1.25 parts of thiocyanate salt per part of 3-amino-1,2,4-triazole; from about 3 to about 10 percent by weight of an ultrafine filler material selected from the group consisting of silicon dioxide, and aluminum oxide and; from about 3 to about 10 percent by weight of a dried, pregelatinized cold water swelling starch.

2. A concentrate according to claim 1 wherein the thiocyanate salt is selected from the group consisting of ammonium thiocyanate and lithium thiocyanate.

References Cited
UNITED STATES PATENTS

| | | | |
|---|---|---|---|
| 2,992,089 | 7/1961 | Melander et al. | 71—81 |
| 3,030,734 | 4/1962 | Brickey | 71—AD |
| 3,161,497 | 12/1964 | Amburn | 71—105 |
| 3,235,357 | 2/1966 | Love | 71—115 |
| 3,535,423 | 10/1970 | Ordas | 71—DIG-1 |

JAMES O. THOMAS, JR., Primary Examiner

U.S. Cl. X.R.

71—DIG-1